(12) United States Patent
Okamoto

(10) Patent No.: US 9,681,009 B2
(45) Date of Patent: Jun. 13, 2017

(54) ALIGNMENT SEQUENCING OF IMAGE DATA AND TO-BE-ACQUIRED SCAN DATA EXECUTABLE BY AN INFORMATION PROCESSING APPARATUS

(71) Applicant: BROTHER KOGYO KABUSHIKI KAISHA, Nagoya-shi, Aichi-ken (JP)

(72) Inventor: Ryoko Okamoto, Kasugai (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 33 days.

(21) Appl. No.: 14/666,028

(22) Filed: Mar. 23, 2015

(65) Prior Publication Data

US 2015/0281478 A1 Oct. 1, 2015

(30) Foreign Application Priority Data

Mar. 31, 2014 (JP) ................. 2014-074320

(51) Int. Cl.
- *G06F 3/12* (2006.01)
- *H04N 1/00* (2006.01)
- *G06F 3/0481* (2013.01)
- *G06F 3/0486* (2013.01)
- *H04N 1/21* (2006.01)

(52) U.S. Cl.
CPC ....... *H04N 1/00411* (2013.01); *G06F 3/0486* (2013.01); *G06F 3/04817* (2013.01); *H04N 1/0097* (2013.01); *H04N 1/21* (2013.01); *H04N 2201/0081* (2013.01)

(58) Field of Classification Search
CPC combination set(s) only.
See application file for complete search history.

(56) References Cited

U.S. PATENT DOCUMENTS

| | | | |
|---|---|---|---|
| 6,643,028 B1 | 11/2003 | Ogaki et al. | |
| 8,913,285 B1* | 12/2014 | Neubrand | H04N 1/3873 358/1.9 |
| 2008/0231914 A1* | 9/2008 | Motoyoshi | H04N 1/00411 358/474 |
| 2010/0007928 A1* | 1/2010 | Kashioka | H04N 1/00225 358/474 |

(Continued)

FOREIGN PATENT DOCUMENTS

| | | |
|---|---|---|
| JP | 2000-174945 A | 6/2000 |
| JP | 2005-064944 A | 3/2005 |
| JP | 2011-166767 A | 8/2011 |

*Primary Examiner* — Henok A Shiferaw
(74) *Attorney, Agent, or Firm* — Merchant & Gould P.C.

(57) ABSTRACT

A medium stores computer-executable programs. The programs cause an information processing apparatus to perform: displaying images based on scan data and a first icon which is draggable, on a display unit; acquiring a drag destination of the first icon; judging whether the drag destination of the first icon is one of a position overlapping with one image included in the images displayed on the display unit and a position adjacent to the one image; in a case that the drag destination of the first icon overlaps with the one image, determining an alignment sequence so that the one image is replaced with an image based on to-be-acquired scan data; and in a case that the drag destination of the first icon is adjacent to the one image, determining the alignment sequence so that the image based on the to-be-acquired scan data is arranged adjacent to the one image.

16 Claims, 14 Drawing Sheets

(56) References Cited

U.S. PATENT DOCUMENTS

| | | | | |
|---|---|---|---|---|
| 2011/0058221 A1* | 3/2011 | Sheng | ............... | H04N 1/00347 358/1.16 |
| 2011/0234518 A1* | 9/2011 | Maruyama | ............ | G06F 3/0481 345/173 |
| 2011/0292438 A1* | 12/2011 | Inami | ............... | H04N 1/00413 358/1.15 |
| 2014/0063541 A1* | 3/2014 | Yamazaki | ............. | G06F 3/1204 358/1.15 |
| 2014/0157189 A1* | 6/2014 | Morita | ................. | G06F 3/0482 715/784 |
| 2014/0320881 A1* | 10/2014 | Ono | .................... | G03G 15/502 358/1.13 |
| 2015/0370438 A1* | 12/2015 | Ito | ....................... | G06F 3/0488 715/750 |
| 2016/0011775 A1* | 1/2016 | Guo | ................... | G06F 3/04817 715/765 |
| 2016/0026365 A1* | 1/2016 | Sasaki | ................ | G06F 3/04817 715/735 |
| 2016/0028907 A1* | 1/2016 | Kato | ................. | H04N 1/00514 358/1.13 |

* cited by examiner

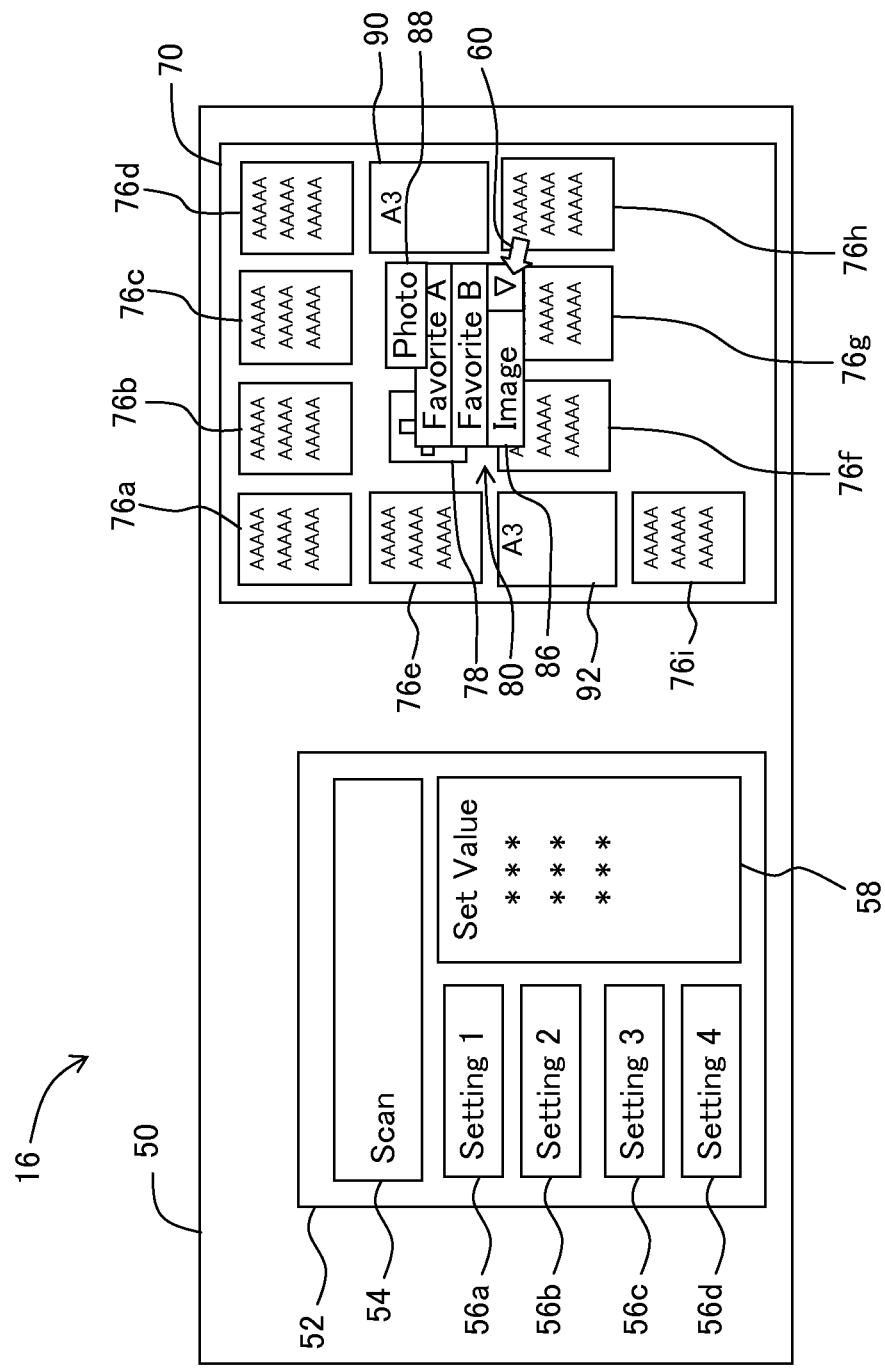

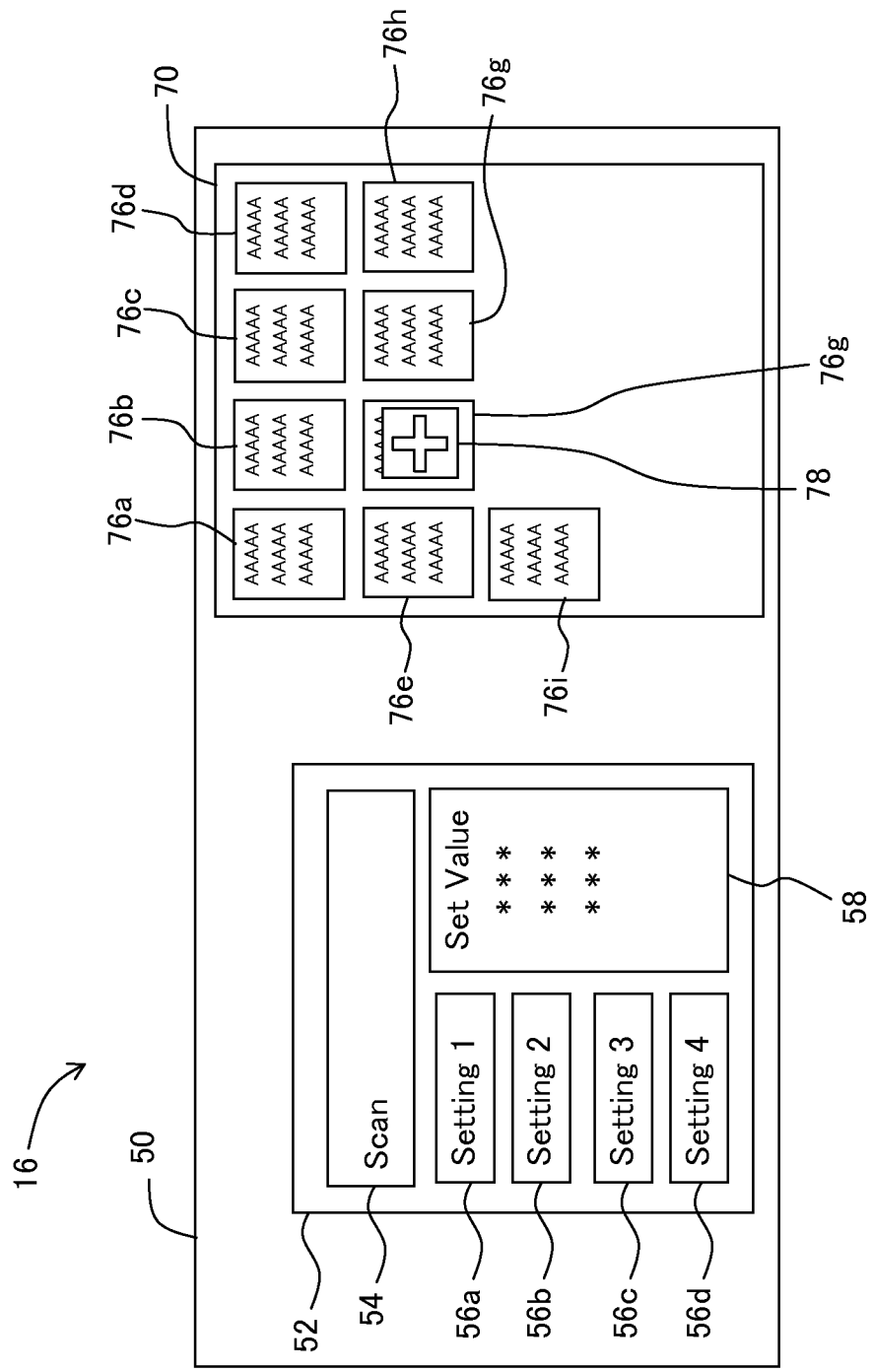

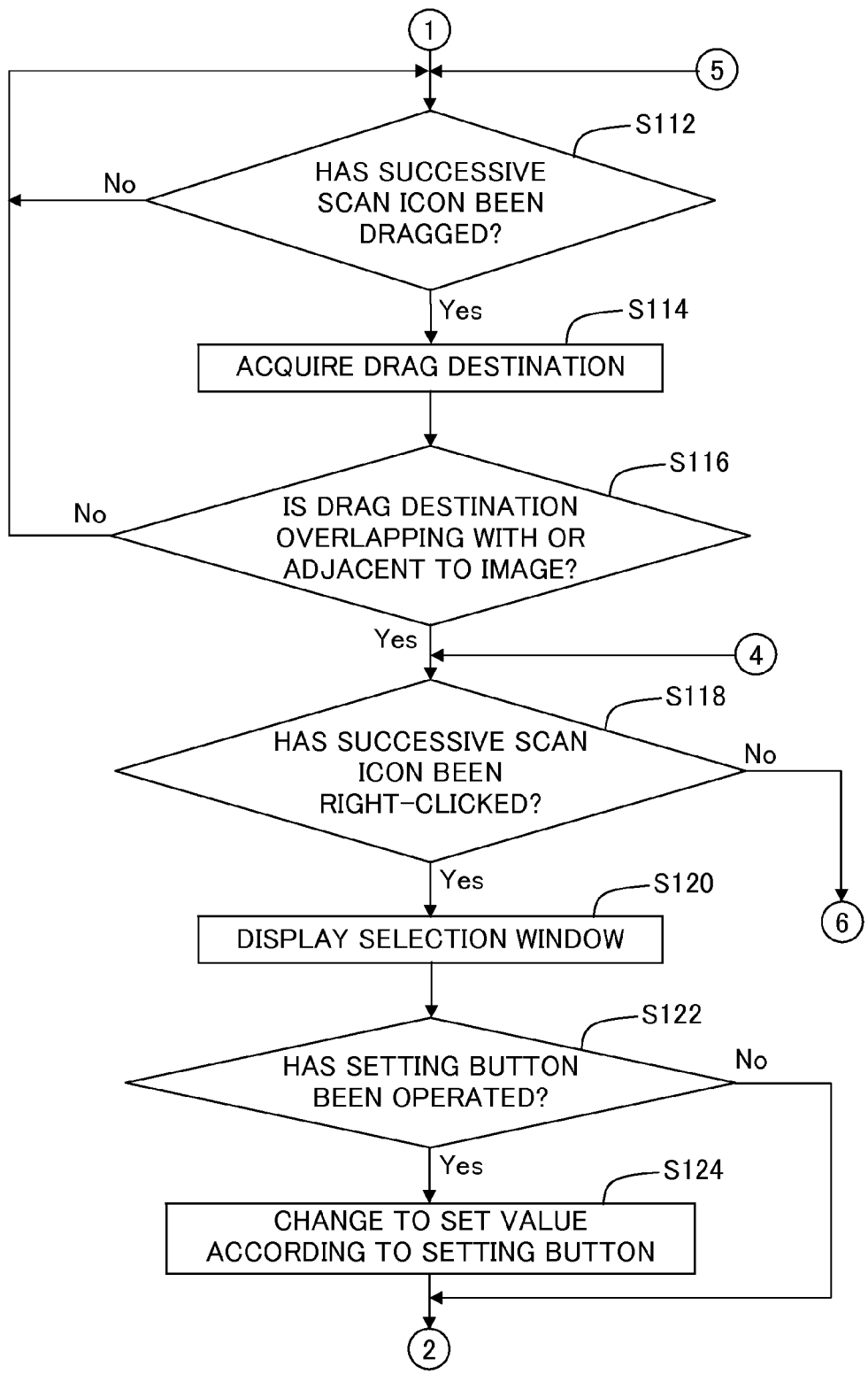

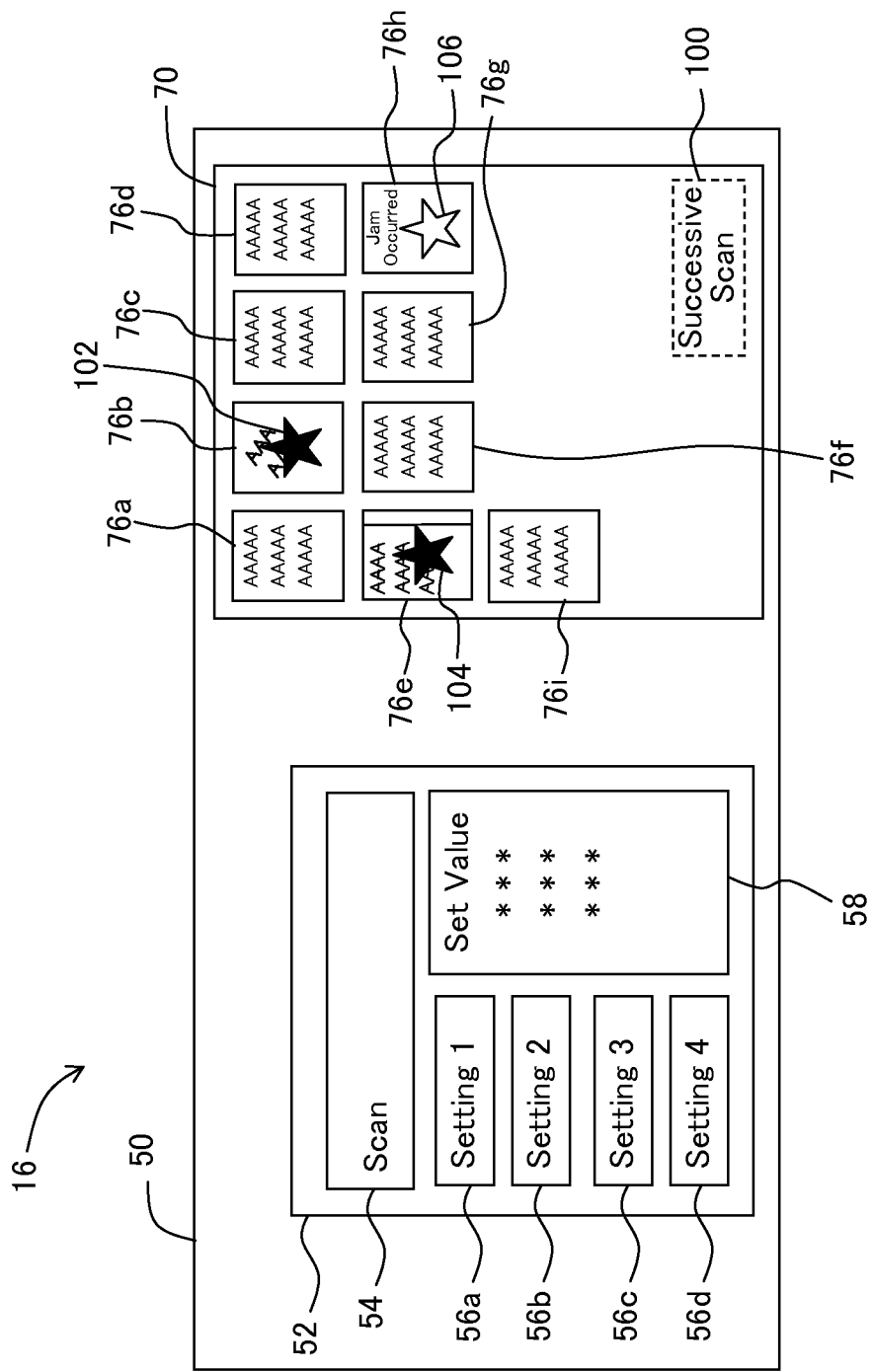

ALIGNMENT SEQUENCING OF IMAGE DATA AND TO-BE-ACQUIRED SCAN DATA EXECUTABLE BY AN INFORMATION PROCESSING APPARATUS

CROSS REFERENCE TO RELATED APPLICATION

The present application claims priority from Japanese Patent Application No. 2014-074320 filed on Mar. 31, 2014, the disclosure of which is incorporated herein by reference in its entirety.

BACKGROUND

Field of the Invention

The present invention relates to a control program and the like which can be executed by a computer of an information processing apparatus including a display unit, and a storage unit storing scan data.

Description of the Related Art

In an information processing apparatus including a display unit, and a storage unit storing scan data, images based on the scan data stored in the storage unit are displayed on the display unit. Then, a successive scanning process is carried out when images of a new document are added to the images displayed on the display unit. The successive scanning process refers to a scanning process carried out when it is desired to collect up the scan data stored in the storage unit and the scan data of the new document. If the successive scanning process is carried out, then in addition to the images displayed previously on the display unit, the images based on the scan data of the new document are displayed. Japanese Patent Application Laid-open No. 2005-64944 discloses one example of the successive scanning process.

SUMMARY

According to the information processing apparatus disclosed in Japanese Patent Application Laid-open No. 2005-64944, through the successive scanning process, in addition to the images displayed previously on the display unit, the images based on the scan data of the new document are displayed. However, in the information processing apparatus disclosed in Japanese Patent Application Laid-open No. 2005-64944, the position of displaying the images of the new document, that is, the order of displaying the images displayed previously on the display unit and the images of the new document has not taken into consideration. Accordingly, the present teaching is made in view of such situations, and an object thereof is to provide an information processing apparatus capable of displaying images of a new document in any desired position in the successive scanning process.

According to a first aspect of the present teaching, there is provided a non-transitory computer-readable medium storing computer-executable programs that, when executed by a processor, cause an information processing apparatus including: a display unit; an operation unit configured to output a signal depending on a user operation; and a storage unit configured to store scan data, to perform: displaying images based on the scan data stored in the storage unit and a first icon which is draggable by the operation unit, on the display unit; acquiring a drag destination of the first icon to which the first icon is dragged, based on the signal outputted from the operation unit depending on a drag operation on the first icon; judging whether the drag destination of the first icon is one of a position overlapping with one image included in the images displayed on the display unit and a position adjacent to the one image; in a case that the information processing apparatus has judged that the drag destination of the first icon is the position overlapping with the one image, determining an alignment sequence of the images displayed on the display unit and an image based on to-be-acquired scan data so that the one image is replaced with the image based on the to-be-acquired scan data; and in a case that the information processing apparatus has judged that the drag destination of the first icon is the position adjacent to the one image, determining the alignment sequence of the images displayed on the display unit and the image based on the to-be-acquired scan data so that the image based on the to-be-acquired scan data is arranged adjacent to the one image.

According to a second aspect of the present teaching, there is provided an information processing apparatus including: a display unit; an operation unit configured to output a signal depending on a user operation; a storage unit configured to store scan data; and a controller, wherein the controller is configured to: display images based on the scan data stored in the storage unit and a first icon which is draggable by the operation unit, on the display unit; acquire a drag destination of the first icon to which the first icon is dragged, based on the signal outputted from the operation unit depending on a drag operation on the first icon; judge whether the drag destination of the first icon is one of a position overlapping with one image included in the images displayed on the display unit and a position adjacent to the one image; in a case that the controller has judged that the drag destination of the first icon is the position overlapping with the one image, determine an alignment sequence of the images displayed on the display unit and an image based on to-be-acquired scan data so that the one image is replaced with the image based on the to-be-acquired scan data; and in a case that the controller has judged that the drag destination of the first icon is the position adjacent to the one image, determine the alignment sequence of the images displayed on the display unit and the image based on the to-be-acquired scan data so that the image based on the to-be-acquired scan data is arranged adjacent to the one image.

According to a third aspect of the present teaching, there is provided an information processing method to be executed by an information processing apparatus provided with: a display unit; an operation unit configured to output a signal depending on a user operation; and a storage unit configured to store scan data, the method including: displaying images based on the scan data stored in the storage unit and a first icon which is draggable by the operation unit, on the display unit; acquiring a drag destination of the first icon to which the first icon is dragged, based on the signal outputted from the operation unit depending on a drag operation on the first icon; judging whether the drag destination of the first icon is one of a position overlapping with one image included in the images displayed on the display unit and a position adjacent to the one image; in a case that the information processing apparatus has judged that the drag destination of the first icon is the position overlapping with the one image, determining an alignment sequence of the images displayed on the display unit and an image based on to-be-acquired scan data so that the one image is replaced with the image based on the to-be-acquired scan data; and in a case that the information processing apparatus has judged that the drag destination of the first icon is the position adjacent to the one image, determining the alignment sequence of the images displayed on the display unit and the image based on the to-be-acquired scan data so that the image based on the to-be-acquired scan data is arranged adjacent to the one image.

According to the medium and the like of the above aspects of the present teaching, images based on the scan data stored in the storage unit and a first icon which is draggable are displayed on the display unit. If the first icon is dragged, then it is judged whether the drag destination of the first icon is one of a position overlapping with one image included in the images displayed on the display unit and a position adjacent to the one image. Further, if it is judged that the drag destination of the first icon overlaps with the one image, then the one image is replaced by the image based on the to-be-acquired scan data. Further, if it is judged that the drag destination of the first icon is adjacent to the one image, then the image based on the to-be-acquired scan data is arranged adjacent to the one image. By virtue of this, in a successive scanning process, it is possible to display images of a new document in any desired position.

BRIEF DESCRIPTION OF THE DRAWINGS

FIG. 6 shows a state in which sample images changed in setting are displayed together with existing images in the preview window.

FIG. 7 shows a state in which the successive scan icon is dragged onto a preview image in the preview window.

FIGS. 8A to 8D show a flowchart illustrating an operation of a PC.

FIG. 11 shows a state in which the successive scan icon is enabled in the preview window according to the third embodiment.

DESCRIPTION OF THE EMBODIMENTS

<Configuration of a Communication System>

Figure 1:
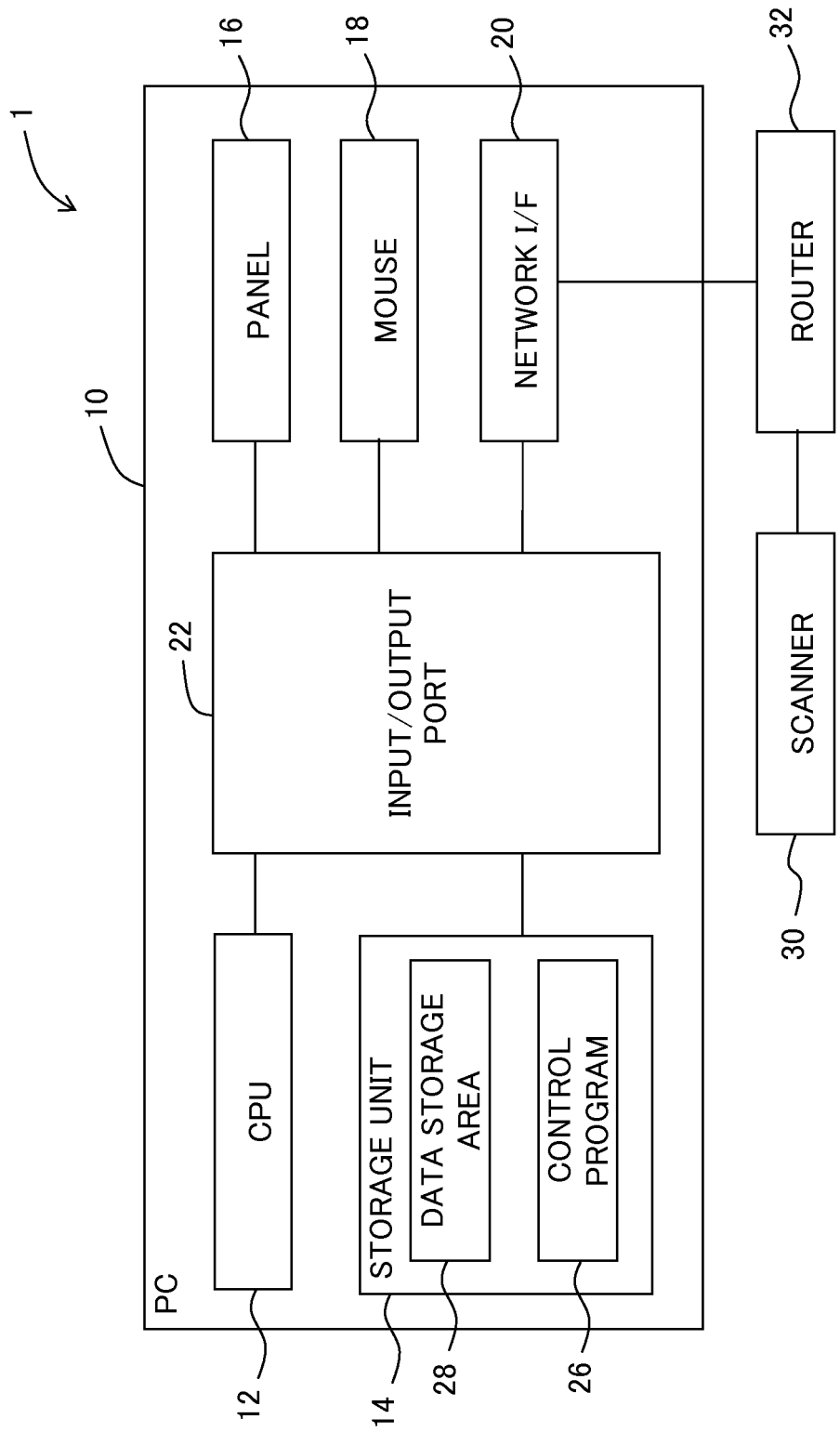
FIG. 1 is a block diagram of a communication system according to a first embodiment of the present teaching.

As shown in FIG. 1, a communication system 1, which is exemplified as a first embodiment of the present teaching, includes a PC 10 (the abbreviation of Personal Computer; an example of the information processing apparatus of the present teaching), a scanner 30, and a router 32.

The PC 10 mainly includes a CPU 12 (the abbreviation of Central Processing Unit; an example of the controller and/or computer of the present teaching), a storage unit 14, a panel 16 (an example of the display unit of the present teaching), a mouse 18 (an example of the operation unit of the present teaching), and a network I/F 20 (an example of the communication unit of the present teaching). Those components are communicable with one another via an input/output port 22.

The network I/F 20 is configured to communicate with external devices via the router 32. In the first embodiment, the network I/F 20 is connected to the scanner 30 via the router 32. By virtue of this, it is possible for the PC 10 to transmit and receive various data to and from the scanner 30.

The panel 16 has a screen, and displays images based on image data and the like on the screen. The mouse 18 is a device for moving a pointer displayed on the screen of the panel 16. The mouse 18 accepts user's drag operation, click operation and the like and outputs a signal depending on an accepted operation.

The CPU 12 executes processes according to a control program 26 stored in the storage unit 14 (an example of the programs of the present teaching). The control program 26 is a program which causes the scanner 30 to execute a scanning process. Hereinafter, the CPU 12, which executes programs such as the control program 26 and the like, may also be referred to as simply as a program name. For example, the term "the control program 26" may mean "the CPU 12 executing the control program 26".

The storage unit 14 is constructed by combining a RAM (the abbreviation of Random Access Memory), a ROM (the abbreviation of Read Only Memory), a flash memory, a HDD (the abbreviation of Hard Disk Drive), a buffer included in the CPU 12, etc. Further, the storage unit 14 includes a data storage area 28 (an example of the storage unit of the present teaching). The data storage area 28 is an area for storing the scan data acquired from the scanner 30, the data needed to execute the control program 26, etc.

<Successive Scanning Process>

In the communication system 1, the scanner 30 executes a scanning process according to a scan command from the PC 10, and a scan data generated through the scanning process is transmitted to the PC 10. On this occasion, if the scanner 30 collectively scans at least one page of a document, then the scan data of the at least one page of the document is stored in the PC 10 as one group of scan data (sometimes to be referred to as "scan data group" below). Then, if the user desires to add a new scan data to that scan data group, then the successive scanning process is carried out. That is, for example, after at least one page of a document has been scanned and the scan data of the at least one page of the document has been stored, if it is desired to store the scan data of a new document together with the scan data of the previously scanned document, then the successive scanning process is carried out. By doing this, the scan data of the new document is stored in association with the scan data of the previously scanned document.

Figure 2:
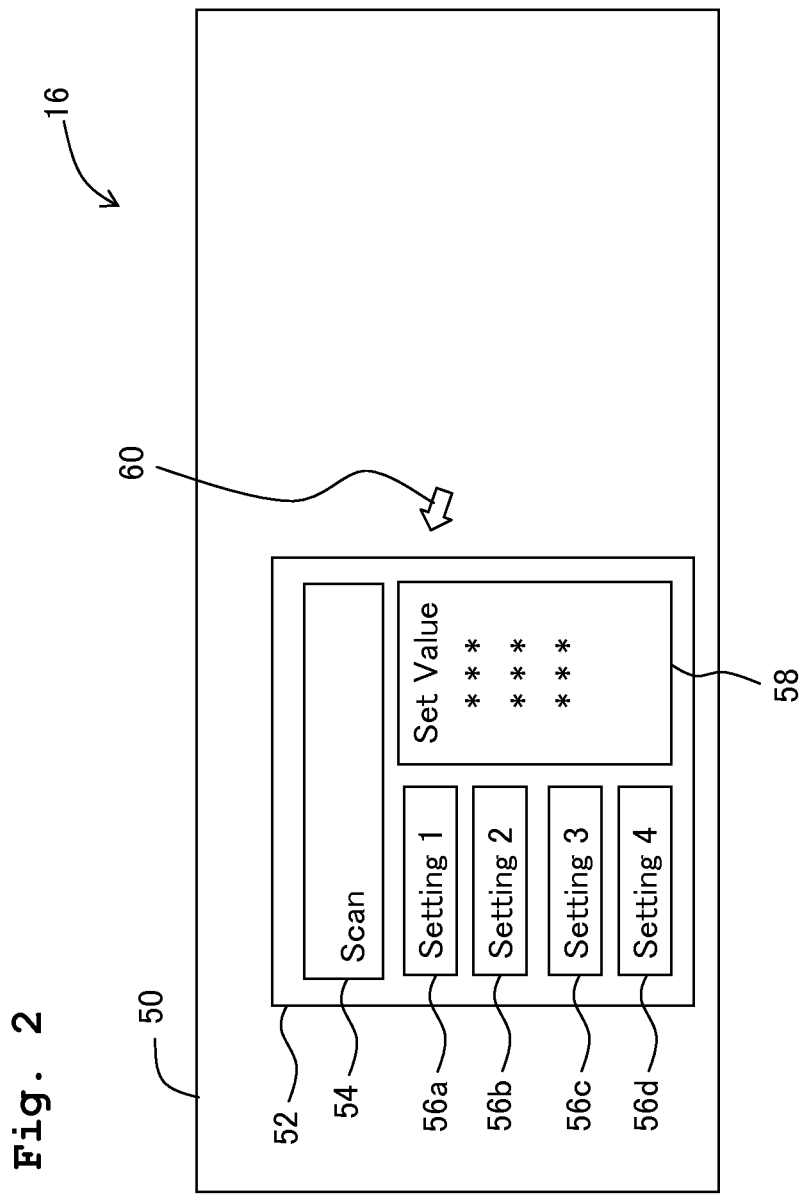
FIG. 2 shows a main window.

If the PC 10 executes the control program 26, then a main window 52 is displayed on a display screen 50 of the panel 16 as shown in FIG. 2. In the main window 52, a main scan icon 54, four setting selection buttons 56a, 56b, 56c and 56d, and a set value display column 58 are displayed. The main scan icon 54 is provided for carrying out the scanning process. The setting selection buttons 56 are provided for selecting a scan setting for the scanning process, and a set value for the scanning process is set to each of the setting selection buttons 56. After a mouse operation is carried out to move a pointer 60 onto the main scan icon 54 or any of the setting selection buttons 56, the user can carry out a selecting operation on any of the main scan icon 54 and setting selection buttons 56 by way of, for example, a left click of the mouse 18.

Further, simply, a left click on a button or the like may refer to a mouse operation to move the pointer 60 to overlap with the image of the main scan icon 54 and the like displayed on the panel 16, and then to carry out a left click. Further, the left click on each button or each icon is an example of the selecting operation of the present teaching. The selecting operation is not limited to the left click on each button or each icon. Further, the set value display column 58 displays the current set value for the scanning process. That is, if the left click is carried out on any one button of the four setting selection buttons 56a to 56d, then the set value set to the operated button is displayed in the set value display column 58.

In the main window 52, if the left click is carried out on the main scan icon 54, then a scan command is transmitted from the PC 10 to the scanner 30. On this occasion, the set value set to the selected button among the four setting selection buttons 56a to 56d is transmitted to the scanner 30 together with the scan command. That is, the PC 10 transmits the scan command including a predetermined set value to the scanner 30. Further, at least one sheet of a document is set on an ADF (the abbreviation of Auto Document Feeder; not shown) or a flatbed (not shown) of the scanner 30.

On receiving the scan command including the predetermined set value, the scanner 30 executes the scanning process according to the set value, and transmits the scan data generated through the scanning process to the PC 10. On receiving the scan data, the PC 10 stores the received scan data as a scan data group in the data storage area 28. In particular, in a case that the scan data is in JPEG format, a plurality of data in JPEG format is formed by scanning a plurality of pages of a document. Therefore, the plurality of data in JPEG format is stored collectively in one folder as a scan data group. On this occasion, a serial number is assigned to the plurality of data in JPEG format, according to the order of scanning the plurality of pages of the document. In particular, for example, (001) is assigned to the scan data of the first page of the document, and (002) is assigned to the scan data of the second page of the document.

Further, in a case that the scan data is in PDF format, one data in PDF format, in which a plurality of scan data is collected, is formed by scanning a plurality of pages of a document. Therefore, the one data in PDF format is stored as a scan data group in the data storage area 28. Further, in forming one data in PDF format, a plurality of scan data is collected up into one data in PDF format in the order of scanning the plurality of pages of the document.

Figure 3:
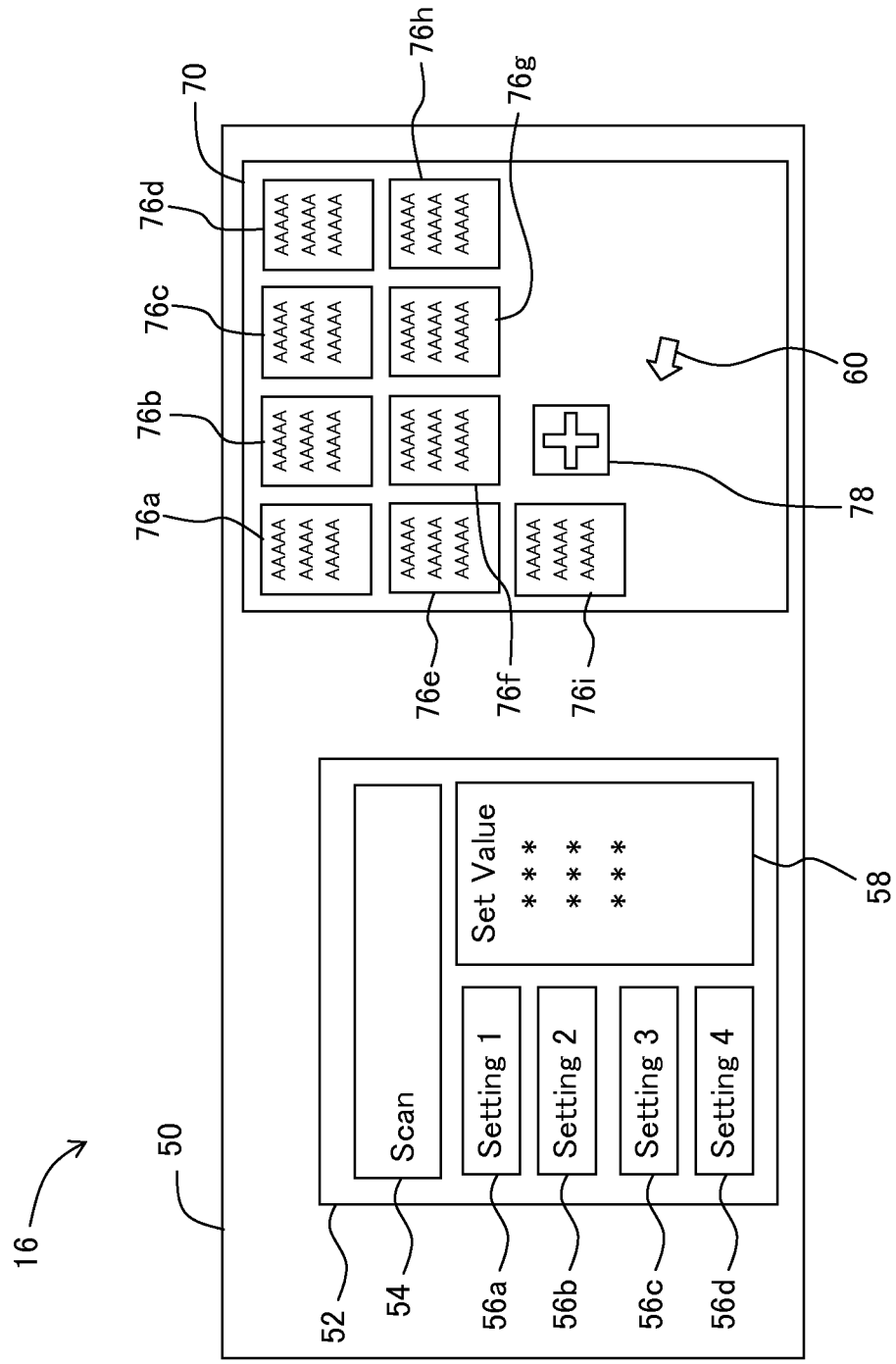
FIG. 3 shows the main window and a preview window.

Further, on receiving the scan data from the scanner 30, the PC 10 displays a preview window 70 adjacent to the main window 52 on the display screen 50 of the panel 16 as shown in FIG. 3. Images 76 based on the received scan data are displayed on the preview window 70. Nine images 76a to 76i are displayed on the preview window 70 shown in FIG. 3. Further, a successive scan icon 78 (an example of the first icon and second icon of the present teaching) is displayed on the preview window 70. The successive scan icon 78 is provided for carrying out the successive scanning process.

As described earlier on, the successive scanning process is executed in a case that the scan data of a new document is stored together with the scan data group (sometimes to be referred to as "existing scan data" below) based on the scanning process executed previously. Further, it is possible to execute the successive scanning process by specifying, by the PC 10, insert position of the scan data of the new document into the existing scan data according to a drag operation of the successive scan icon 78.

Figure 4:
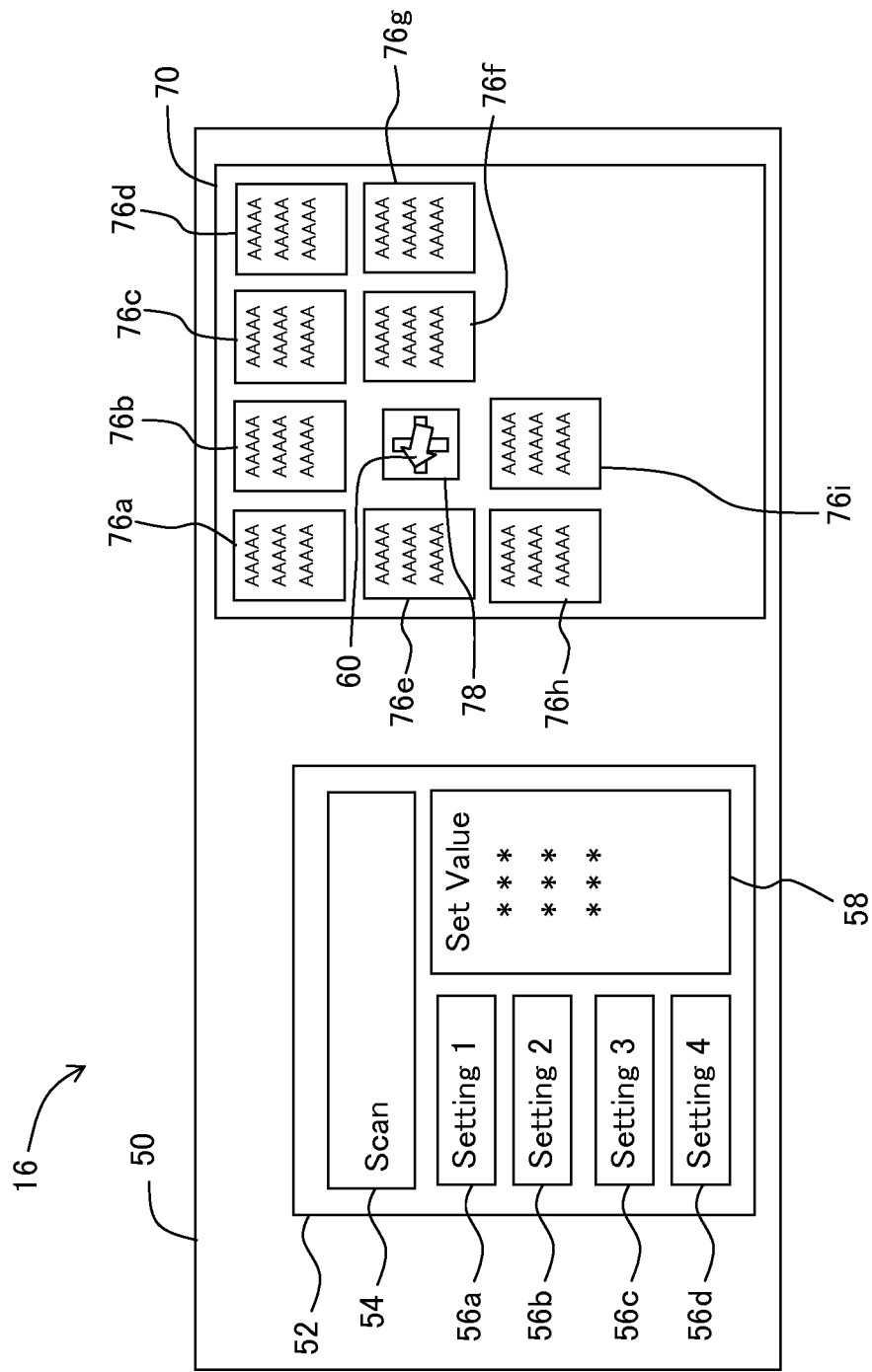
FIG. 4 shows a state in which a successive scan icon is dragged in the preview window.

In particular, for example, in a case that it is desired to insert an additional document between the fifth page and the sixth page of a plurality of pages of a document scanned previously, the user moves the pointer 60 to a position between the fifth image 76e and the sixth image 76f among the images 76a to 76i displayed in the preview window 70 in a state that the successive scan icon 78 is left clicked, as shown in FIG. 4. By virtue of this, the successive scan icon 78 is displayed between the fifth image 76e and the sixth image 76f. On this occasion, the images from the sixth image 76f, that is, the sixth to ninth images 76f to 76i are displayed in the preview window 70 in a shifted position by the space occupied by the successive scan icon 78.

Then, in a state that the document to be added is set on the ADF (the abbreviation of Auto Document Feeder, not shown) or the flatbed (not shown) of the scanner 30, if the left click is carried out on the successive scan icon 78 displayed between the fifth image 76e and the sixth image 76f, then the scan command is transmitted from the PC 10 to the scanner 30. On this occasion, while the set value for the scanning process is also transmitted together with the scan command, the set value for the scanning process is set to correspond to the preview window 70.

In detail, when images are displayed on the preview window 70, the set value for the scanning process at the time of generating the scan data of the latest images, which are recently displayed in the preview display field 70, is stored in the data storage area 28 stores in association with the preview window 70. That is, for example, the latest images 76 displayed in the preview window 70 shown in FIG. 3 are generated in the scanning process executed by an operation to the main scan icon 54 in FIG. 2, and the set value for that scanning process is the set value according to the setting selection button 56 selected in the main window 52 of FIG. 2. Therefore, when the images 76 are displayed in the preview window 70, the preview window 70 and the set value according to the setting selection button 56 selected in the main window 52 of FIG. 2 are stored in the data storage area 28 in association with each other. Then, if the left click operation is carried out on the successive scan icon 78 in the preview window 70, then the set value stored in association with the preview window 70 is extracted from the data storage area 28, and the extracted set value is transmitted to the scanner 30 together with the scan command. By virtue of this, it is possible to carry out the scanning process for the additional document with the same set value as that for the existing scan data, without any setting operation for the successive scanning process, etc.

On receiving the scan command according to the predetermined set value, the scanner 30 carries out the scanning process according to the set value, and transmits the scan data generated through the scanning process to the PC 10. On receiving the scan data, the PC 10 associates the scan data (sometimes to be referred to as "successive scan data" below, an example of the to-be-acquired scan data in the present teaching) with the existing scan data, that is, with the scan data of the images 76 displayed on the preview window 70, and stores the successive scan data and the existing scan data in the data storage area 28 as a group of scan data. On this occasion, according to the position specified by the successive scan icon 78, the PC 10 determines alignment sequence (arrangement order) of the successive scan data and the existing scan data and stores the successive scan data and the existing scan data in the data storage area 28 in accordance with the determined alignment sequence.

In particular, if the scan data is in JPEG format, then the successive scan data is stored in the folder storing the existing scan data. On this occasion, a serial number according to the insert position into the existing scan data is assigned to the successive scan data, and the serial number of the latter part of the existing scan data after the insert position of the successive scan data is increased by the number of inserted scan data. For example, as shown in FIG. 4, in the preview window 70, the left click operation is carried out on the successive scan icon 78 displayed between the fifth image 76e and the sixth image 76f and, if two new scan data are received, then (006) and (007) are assigned to the two successive scan data respectively, and (006) formerly assigned to the scan data of the sixth image 76f is replaced with (008). Further, the serial numbers formerly assigned to the scan data of the images from the seventh image 76g are replaced with numbers increased by two respectively. In this manner, by assigning a serial number to the existing scan data and the successive scan data, it is possible to store the successive scan data and the existing scan data as a scan data group in the order intended by the user.

Further, if the scan data is in PDF format, then the existing scan data and the successive scan data are joined together, and the one data in PDF format is stored as a scan data group. On this occasion, the successive scan data and the existing scan data are joined in a state that the successive scan data is inserted into the existing scan data in accordance with the position of the successive scan icon 78. For example, as shown in FIG. 4, in the preview window 70, if the left click operation is carried out on the successive scan icon 78 displayed between the fifth image 76e and the sixth image 76f, then the successive scan data is joined behind the scan data of the fifth image 76e, and the scan data of the sixth image 76f is joined behind the successive scan data. In this manner, by joining the existing scan data and the successive scan data, it is possible to store the successive scan data and the existing scan data as one data in the order intended by the user.

Regardless of whether the scan data is in JPEG format or in PDF format, the number of successive scan data to be inserted may be fixed in advance. Further, when the left click is carried out on the successive scan icon 78 to transmit the scan command to the scanner 30, such data may be taken as the successive scan data, that is, the scan data obtained by scanning all pages of a document set on the ADF or scanning a document placed on the flatbed.

On receiving the successive scan data from the scanner 30, the PC 10 displays the images based on the successive scan data in the position of the successive scan icon 78 on the preview window 70. That is, between the fifth image 76e and the sixth image 76f, the images based on the successive scan data are displayed. In this manner, on the PC 10, only by operating the successive scan icon 78 displayed in the preview window 70, it is possible to designate the insert position of the successive scan data while adding a new scan data to the existing scan data of the images 76 displayed in the preview window 70.

In the successive scanning process described above, the successive scan data is inserted between two existing scan data. However, it is possible to add the successive scan data to the head of the existing scan data or to the end of the existing scan data. In such cases, the successive scan icon 78 is moved by a drag operation to the immediate left of the image 76a or to the immediate right of the image 76i.

Figure 5:
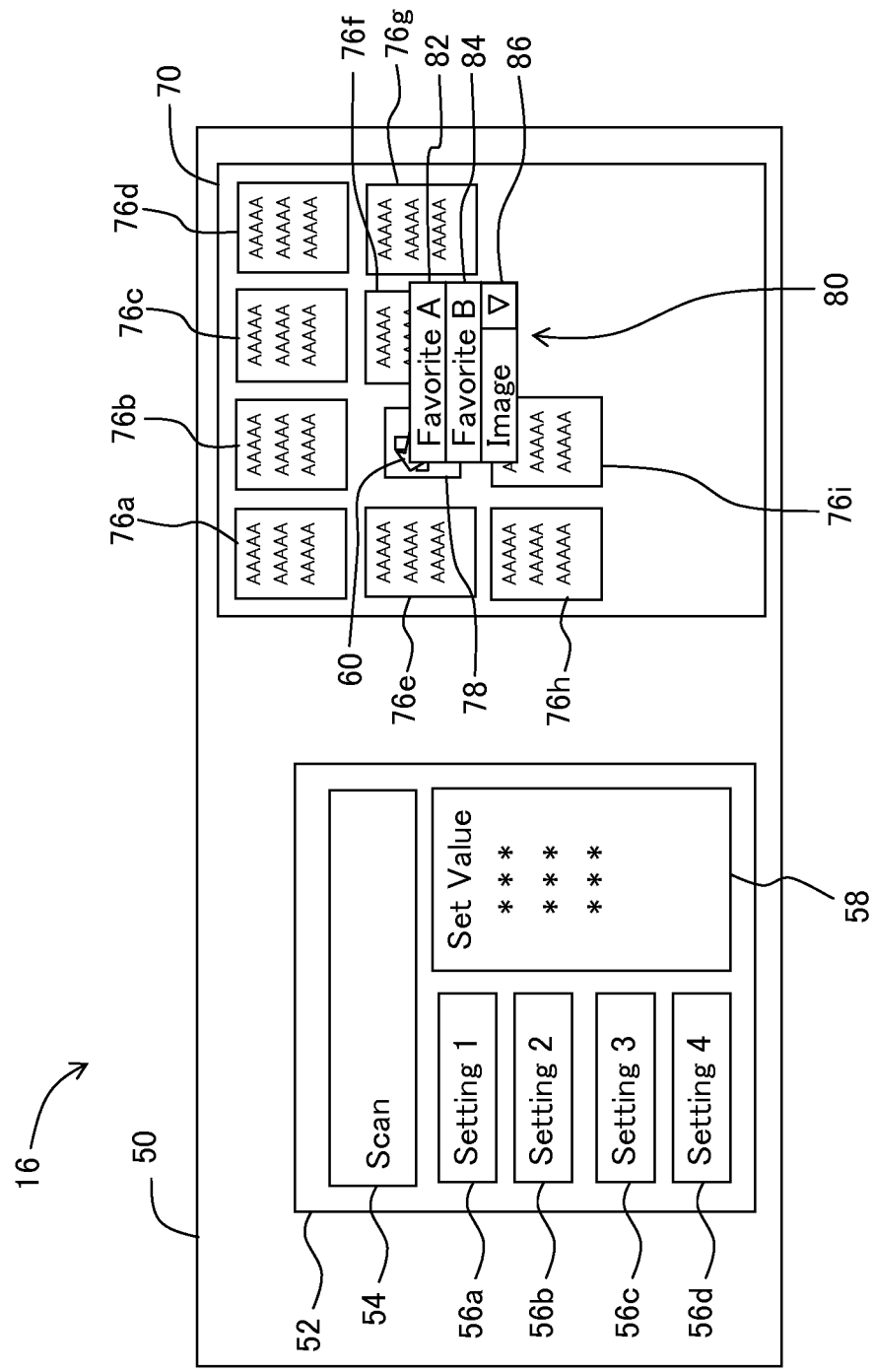
FIG. 5 shows a state in which a selection window is displayed adjacent to the successive scan icon in the preview window.

Further, in the above successive scanning process, the set value for the scanning process of an additional document is the same as the set value for the existing scan data of the latest displayed images. However, it is possible to carry out the scanning process of an additional document with a set value different from the set value for the existing scan data of the latest displayed images. In detail, by carrying out a right click on the successive scan icon 78 in the preview window 70, as shown in FIG. 5, a selection window 80 is displayed adjacent to the successive scan icon 78. Setting alteration buttons 82 and 84, and an image button 86 (an example of the third icon of the present teaching) are displayed in the selection window 80. The setting alteration buttons 82 and 84 are provided for changing the set value for the successive scanning process, and a set value for the scanning process is set for each of the setting alteration buttons 82 and 84. By carrying out the left click operation on any of the setting alteration buttons 82 and 84, the set value for the successive scanning process is changed to the set value according to the operated button. Then, by carrying out the left click operation on the successive scan icon 78, the successive scanning process is carried out according to the changed set value. If the set value for the successive scanning process is changed, then the set value for the successive scanning process stored in association with the preview window 70 is updated to the set value changed by the operation to any of the setting alteration buttons 82 and 84.

The image button 86 is provided for displaying, on the display screen 50 of the panel 16, sample images of adding a new document to the document previously finished with the scanning process, before carrying out the successive scanning process. In particular, by carrying out the left click operation on the pulldown button of the image button 86, a pulldown menu (not shown) is displayed under the image button 86. A plurality of selection buttons (not shown) for selecting document sizes such as the Photo Size, A4 Size, A3 Size, etc. is displayed in the pulldown menu, and by selecting any of the plurality of selection buttons, images in sizes according to the selected buttons are displayed following the successive scan icon 78.

For example, if the image button 86 is operated when the successive scan icon 78 is displayed between the fifth image 76e and the sixth image 76f, and if on the pulldown menu, operation is carried out on the selection button for the Photo Size, the selection button for the A3 Size, and the selection button for the A3 Size, then there are displayed a sample image 88 (an example of the fourth icon of the present teaching) sized at the same ratio as the document in the Photo Size, a sample image 90 (another example of the fourth icon of the present teaching) sized at the same ratio as the document in the A3 Size, and a sample image 92 (still another example of the fourth icon of the present teaching) sized at the same ratio as the document in the A3 Size, following the successive scan icon 78, as shown in FIG. 6. On this occasion, the images from the sixth image 76f, that is, the sixth to ninth images 76f to 76i are displayed on the preview window 70 in a shifted state by the space occupied by the three sample images 88, 90, and 92. By virtue of this, it is possible for the user to imagine the alignment sequence of the documents and the like as if the successive scanning process were carried out, without actually carrying out the successive scanning process.

Then, in the preview window 70 in the state shown in FIG. 6, by carrying out the left click operation on the successive scan icon 78, the successive scanning process is carried out according to the document sizes of the sample images 88, 90 and 92 displayed in the preview window 70. That is, for example, if three pages of a document are set on the ADF, then the scanning process for the Photo Size is carried out for the first page of the document, whereas the scanning process for the A3 Size is carried out for the second and third pages of the document. Since it is not necessary to change the document size for each page of the document, it is convenient for the user. Further, for example, even if five pages of a document are set on the ADF, only three pages of the document will be scanned. By virtue of this, it is possible to prevent scanning mistakes and the like. Further, for example, if a document in the Photo Size is set on the flatbed while another document in the A3 Size is set on the ADF, then the scan data of the document in the Photo Size is inserted after the fifth image 76e, while the scan data of the document in the A3 Size is inserted after the scan data of the document in the Photo Size. In this manner, by carrying out successive scanning process with the sample images 88, 90 and 92 being displayed in the preview window 70, it is possible to carry out the scanning process very efficiently.

Further, in the successive scanning process described above, the successive scan data is stored in such a state as inserted between or adjacent to the existing scan data. However, it is possible to store the successive scan data in place of the existing scan data. That is, it is possible to change the existing scan data to the successive scan data. For example, if any of the images 76 displayed in the preview window 70 is not suitable or, in particular, if the image 76 is blank due to an occurrence of some error, paper jam or the like, or if the image 76 is displayed in an inclined state or the like, or if a different document is scanned from what was intended, then it is possible to change the scan data of the unsuitable image 76 to the scan data of a new document.

For example, if the fifth image 76f in the preview window 70 is not a suitable image, then the successive scan icon 78 is moved to overlap with the image 76f by a drag operation, as shown in FIG. 7. Then, at the time of carrying out the left click on the successive scan icon 78 in that position, the scan command is transmitted from the PC 10 to the scanner 30.

On this occasion, while the set value for the scanning process is also transmitted together with the scan command, the sect value for the scanning process is that for the scanning process in which the scan data of the image 76f has been generated. That is, if the successive scan icon 78 is moved to be adjacent to the image 76 and, in that position, if the successive scanning process is carried out, then such a set value is used as that set to correspond to the preview window 70 (as that for the scanning process in which the scan data of the latest image displayed in the preview window 70 has been generated). However, if the successive scan icon 78 is moved to overlap with the image 76 and, in that position, if the successive scanning process is carried out, then the same set value is used as for the scan data of that image. By virtue of this, when changing, to the successive scan data, the scan data of the image selected by operating the successive scan icon 78 (sometimes to be referred to as "to-be-changed scan data" below), it is possible to take over the set value for the to-be-changed scan data as the set value for the successive scan data.

In detail, when the scan data obtained by operating the main scan icon 54 is stored in the data storage area 28, and when the scan data obtained by the successive scanning process is stored in the data storage area 28, each of the scan data and the set value for the scanning process in which the scan data has been generated are stored in the data storage area 28. The set value stored then is associated with the preview window 70, and is independent from the set value stored in the data storage area 28. Therefore, when storing the successive scan data instead of the scan data of any of the images 76 displayed in the preview window 70, it is still possible to carry out the successive scanning process with the set value for the scanning process in which the to-be-changed scan data is generated.

On receiving the scan command including a predetermined set value, the scanner 30 carries out the scanning process according to the set value, and then transmits the scan data generated through the scanning process to the PC 10. On receiving the scan data, the PC 10 associates the successive scan data with the existing scan data such that the to-be-changed scan data is overwritten by the scan data (that is, the successive scan data), and then stores the same in the data storage area 28.

In particular, if the scan data is in JPEG format, then the successive scan data is stored in the folder storing the existing scan data. At this time, the to-be-changed scan data among the existing scan data is deleted. Then, the serial number assigned to the to-be-changed scan data is assigned to the successive scan data. In this manner, by assigning the serial number to the successive scan data, it is possible to change the to-be-changed scan data to the successive scan data without changing the alignment sequence of the scan data.

Further, if the scan data is in PDF format, then the to-be-changed scan data is deleted from the one data in PDF format as the existing scan data. Then, the successive scan data is joined with the data in PDF format from which the to-be-changed scan data is deleted. At this time, the successive scan data is joined in the position where the to-be-changed scan data existed. In this manner, by joining the existing scan data and the successive scan data, it is possible to change the to-be-changed scan data to the successive scan data without changing the alignment sequence of the scan data.

Further, on receiving the successive scan data from the scanner 30, the PC 10 displays the image based on the successive scan data instead of the image selected by the successive scan icon 78 in the preview window 70. That is, when the successive scan icon 78 is displayed to overlap with the sixth image 76f, if the successive scanning process is carried out, then the sixth image 76f is replaced with the image based on the successive scan data.

<Control Program>

The successive scanning process described above is carried out by the CPU 12 of the PC 10 which executes the control program 26. Hereinbelow, using FIGS. 8A to 8D, an explanation will be made on a flow for the CPU 12 to execute the control program 26. Further, this flow is executed repetitively until an operation is carried out to select an unshown exit button in the main window 52.

Figure 8A:
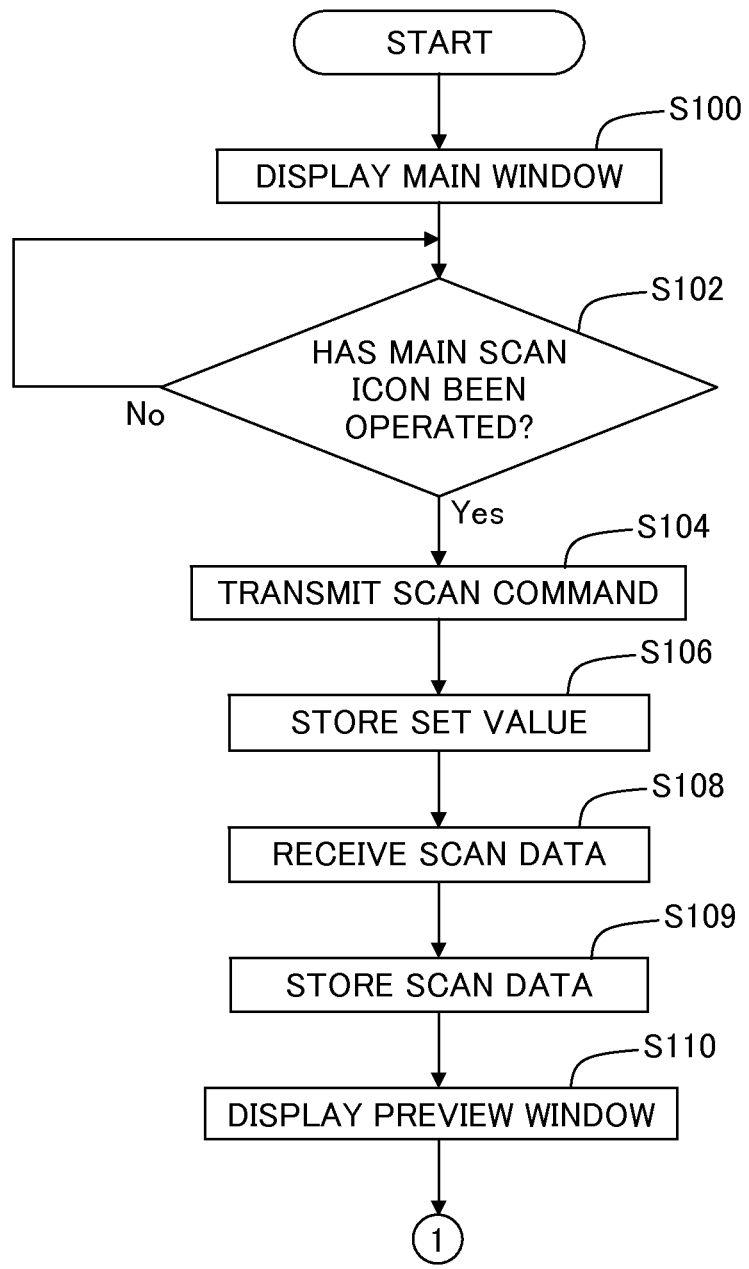
Figure 8C:
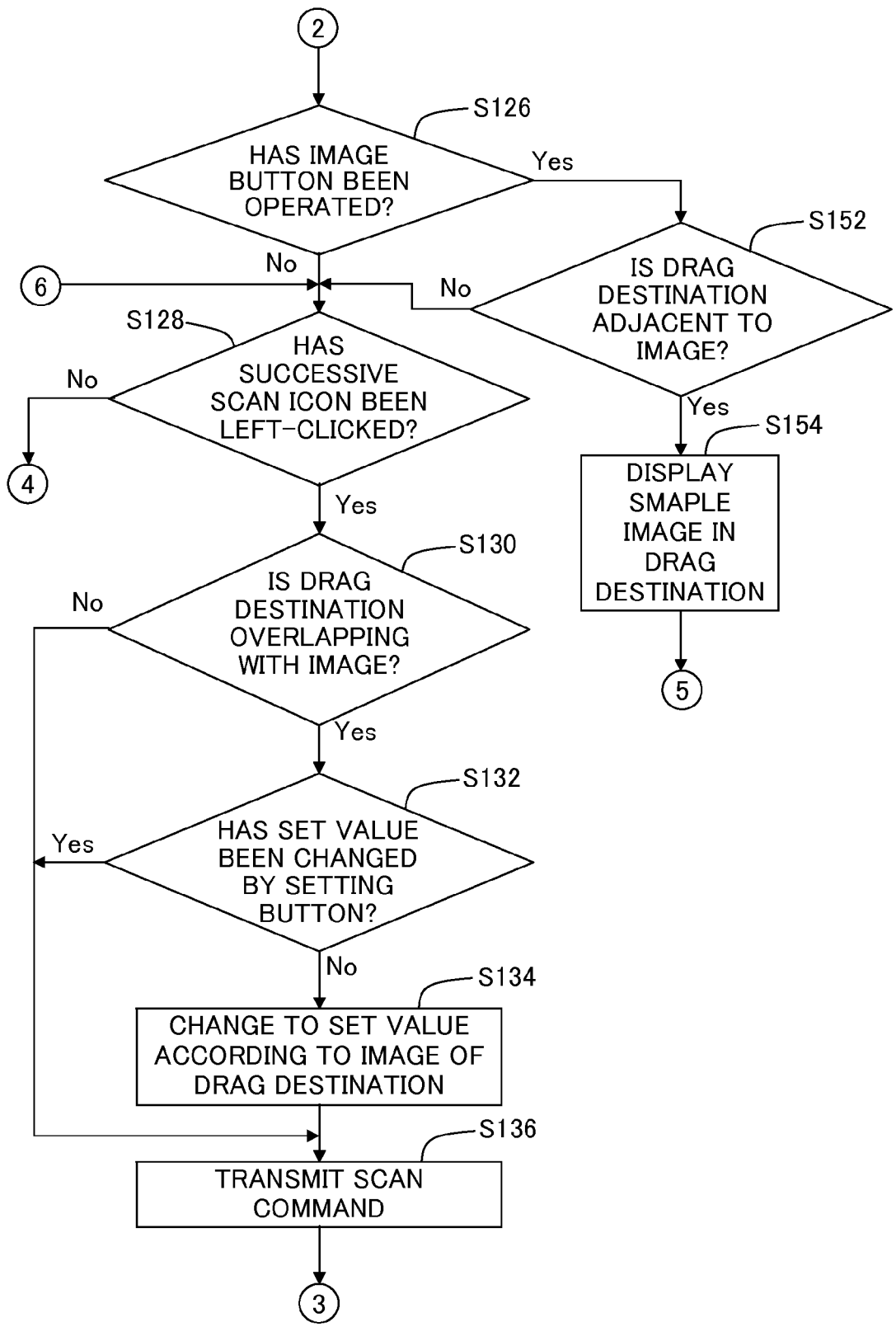
Figure 8D:
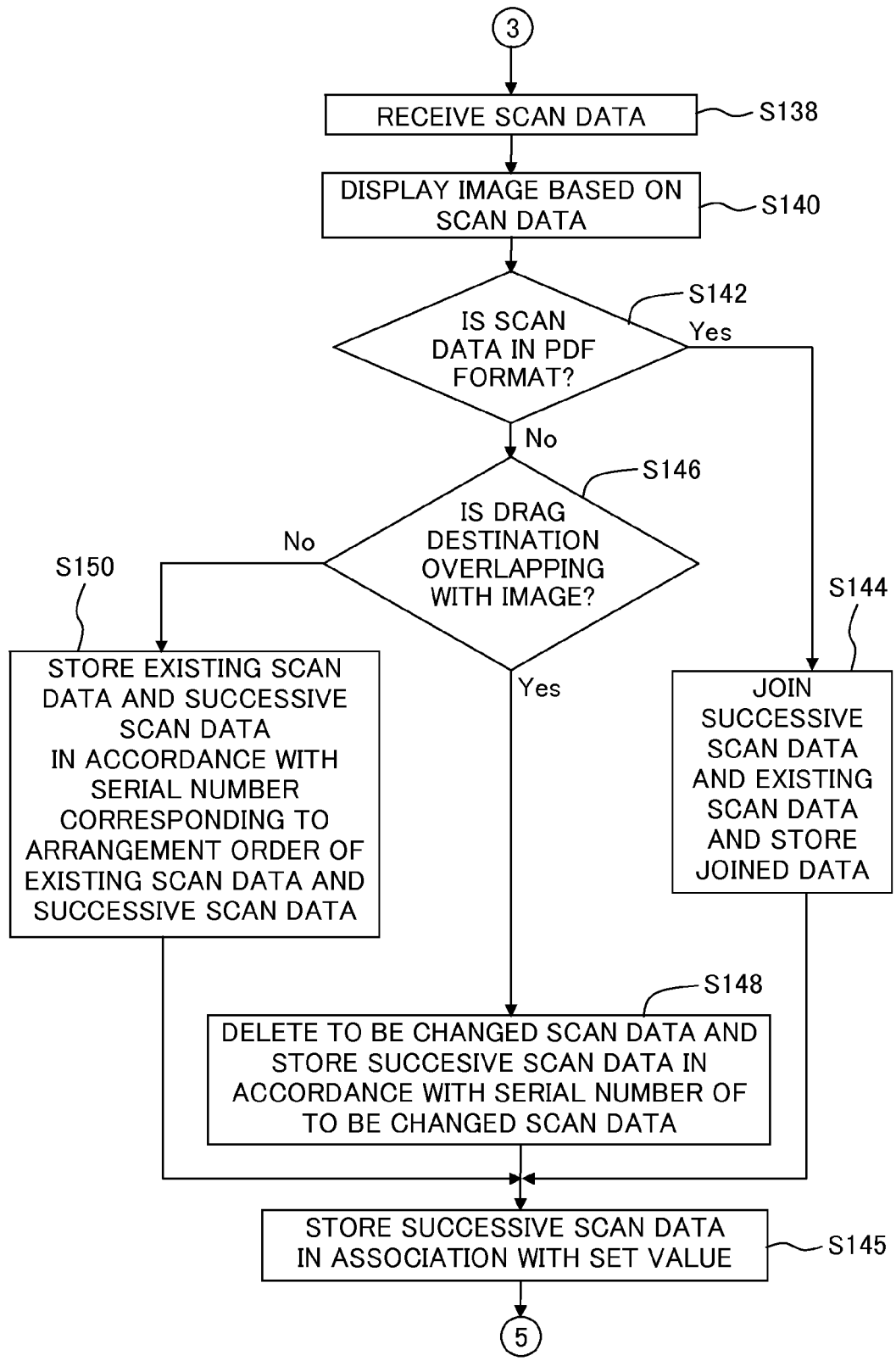

If the control program 26 is executed, then as shown in FIG. 8A, the main window 52 is displayed in the display screen 50 of the panel 16 of the PC 10 (step 100; the word "step" will be abbreviated as "S", below). Next, the CPU 12 judges whether or not the left click operation is carried out on the main scan icon 54 of the main window 52 (S102). If the left click operation is not carried out on the main scan icon 54 (S102: No), then the process of S102 is repeated. On the other hand, if the left click operation is carried out on the main scan icon 54 (S102: Yes), then the scan command is transmitted to the scanner 30 (S104). At this time, the set value for the scanning process according to the setting selection button 56 being selected is transmitted to the scanner 30, together with the scan command. Then, the set value for the scanning process is stored in the data storage area 28 in association with the preview window 70.

On transmitting the scan command, the PC 10 receives the scan data from the scanner 30, as the reply to the scan command (S108). Then, the PC 10 stores the received scan data in the data storage area 28 in association with the set value transmitted in S104 (S109), and then displays the images 76 based on the received scan data in the preview window 70 (S110). Next, the CPU 12 judges whether or not the successive scan icon 78 is dragged in the preview window 70 (S112). If the successive scan icon 78 is not dragged (S112: No), then the process of S112 is repeated.

If the successive scan icon 78 is dragged (S112: Yes), then a drag destination is acquired (S114). Next, the CPU 12 judges whether or not the drag destination is overlapping with or adjacent to the image 76 in the preview window 70 (S116). If the drag destination is neither overlapping with nor adjacent to the image 76 (S116: No), then the process returns to S112. On the other hand, if the drag destination is overlapping with or adjacent to the image 76 (S116: Yes), then the CPU 12 judges whether or not there is a right click on the successive scan icon 78 (S118).

If there is a right click on the successive scan icon 78 (S118: Yes), then the selection window 80 is displayed adjacent to the successive scan icon 78 (S120). Then, the CPU 12 judges whether or not there is a left click on any of the setting alteration buttons 82 and 84 of the selection window 80 (S122). If there is a left click on any of the setting alteration buttons 82 and 84 (S122: Yes), then the set value stored in the data storage area 28 is changed to the set value according to the selected one of the setting alteration buttons 82 and 84 (S124). Then, the process proceeds to S126. On the other hand, if there is no left click on any of the setting alteration buttons 82 and 84 (S122: No), then the process of S124 is skipped, and the process proceeds to S126.

In S126, the CPU 12 judges whether or not there is a left click on the image button 86 (S126). If there is no left click on the image button 86 (S126: No), or if there is no right click on the successive scan icon 78 in S118 (S118: No), then the CPU 12 judges whether or not there is a left click on the successive scan icon 78 (S128). If there is no left click on the successive scan icon 78 (S128: No), then the process returns to S118. On the other hand, if there is a left click on the successive scan icon 78 (S128: Yes), then the CPU 12 judges whether or not the drag destination of the successive scan icon 78 is overlapping with the image 76 (S130).

If the drag destination of the successive scan icon 78 is overlapping with the image 76 (S130: Yes), then the CPU 12 judges whether or not the set value is changed by operating any of the setting alteration buttons 82 and 84 (S132). If the set value is not changed (S132: No), then the set value for the scanning process, which is stored in the data storage area 28 in association with the preview window 70, is changed to the set value stored in the data storage area 28 in association with the image 76 overlapped with the drag destination (S134). Then, the process proceeds to S136. Further, if the drag destination of the successive scan icon 78 is adjacent to the image 76 (S130: No), or if the set value is changed (S132: Yes), then the process proceeds to S136.

In S136, the scan command is transmitted to the scanner 30 (S136). At this time, the set value stored in the data storage area 28 is transmitted to the scanner 30, together with the scan command. On transmitting the scan command, the PC 10 receives the scan data from the scanner 30 as the reply to the scan command (S138). Then, the PC 10 displays the images 76 based on the received scan data on the preview window 70 (S140). Next, the CPU 12 judges whether or not the acquired scan data is in PDF format (S142).

If the acquired scan data is in PDF format (S142: Yes), then the acquired scan data is joined with the existing scan data, and the joined data is stored in the data storage area 28 (S144). Further, the successive scan data is stored in the data storage area 28 in association with the set value (S145). Then, the process returns to S112. On the other hand, if the acquired scan data is not in PDF format (S142: No), then the CPU 12 judges whether or not the drag destination of the successive scan icon 78 is overlapping with the image 76 (S146).

If the drag destination of the successive scan icon 78 is overlapping with the image 76 (S146: Yes), then the to-be-changed scan data is deleted, and the successive scan data is stored in the data storage area 28 with the serial number of the to-be-changed scan data (S148). Then, the process is carried out from S145. On the other hand, if the drag destination of the successive scan icon 78 is adjacent to the image 76 (S146: No), then the existing scan data and the successive scan data are stored in the data storage area 28 with the serial numbers of the existing scan data and the successive scan data according to their alignment sequence (S150). Then, the process is carried out from S145.

Further, if there is a left click on the image button 86 in S126 (S126: Yes), then the CPU 12 judges whether or not the drag destination of the successive scan icon 78 is adjacent to the image 76 (S152). If the drag destination of the successive scan icon 78 is adjacent to the image 76 (S152: Yes), then the sample images 88, 90 and 92 are displayed in the drag destination (S154). Then, the process is carried out from S112. On the other hand, if the drag destination of the successive scan icon 78 is overlapping with the image 76 (S152: No), then the process is carried out from S128.

Second Embodiment

Figure 9:
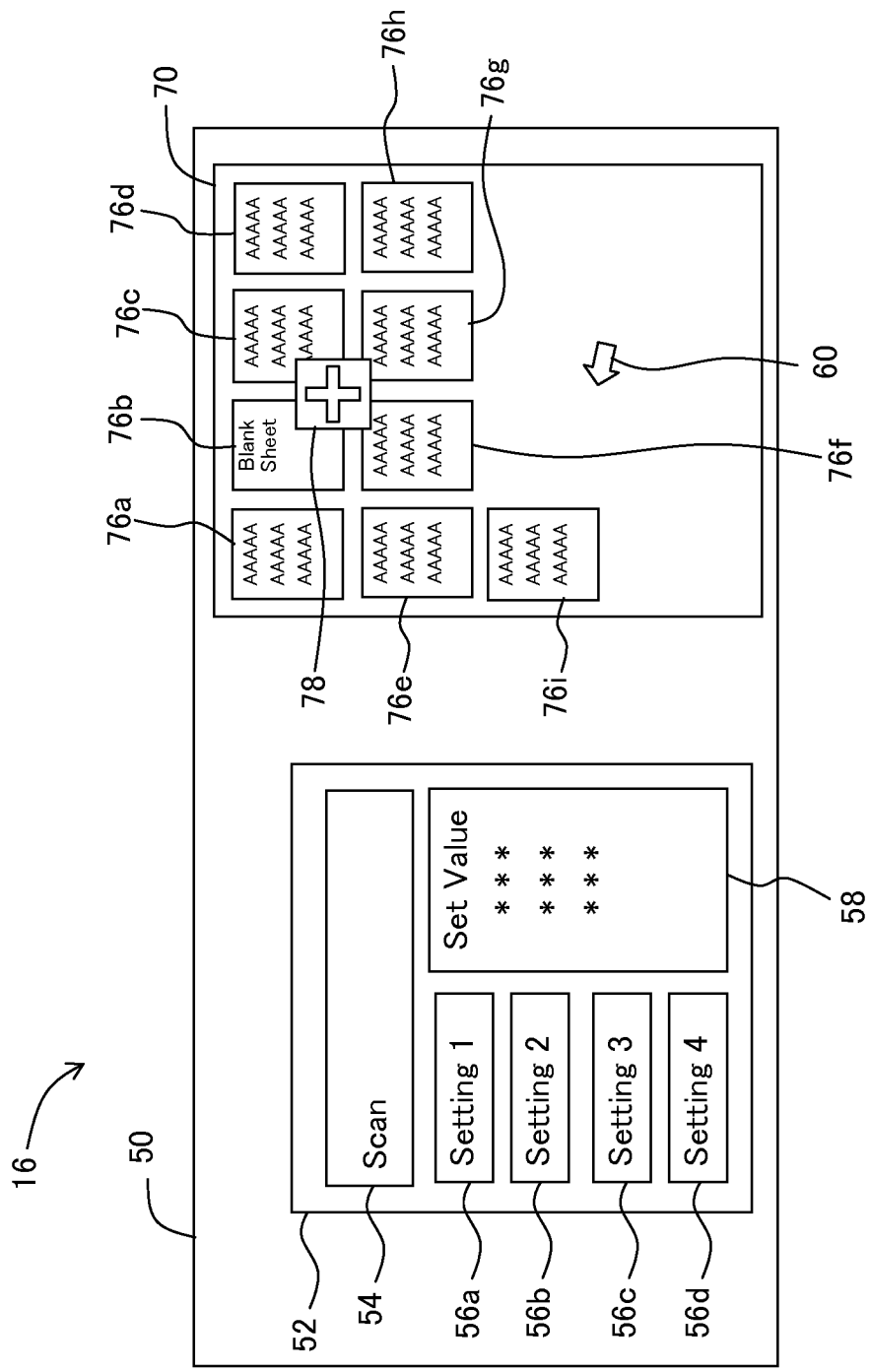
FIG. 9 shows a main window and a preview window according to a second embodiment of the present teaching.

In the first embodiment, the user sets up the position of inserting the successive scan data through a drag operation. However, it is possible to automatically set up the position of inserting the successive scan data. In particular, the PC 10 according to a second embodiment includes a function section (sometimes to be referred to as "an error image extraction section" below) configured to extract error images such as, for example, blank images due to an occurrence of paper jam or the like, images displayed obliquely out of place or the like, and so on. Further, if the error image extraction section extracts an error image, then the successive scan icon 78 is automatically moved to overlap with the error image. That is, as shown in FIG. 9 for example, if the image 76b displayed in the preview window 70 is a blank image, and the error image extraction section judges that the image 76b is an error image, then the successive scan icon 78 is automatically moved to overlap with the image 76b. Then, it is possible for the user to change the error image to an image of a new document by just carrying out the left click on the successive scan icon 78 having automatically moved to overlap with the image 76b. In this manner, it is possible for the PC 10 in the second embodiment to reduce user's operations in replacing the document.

Third Embodiment

Figure 10:
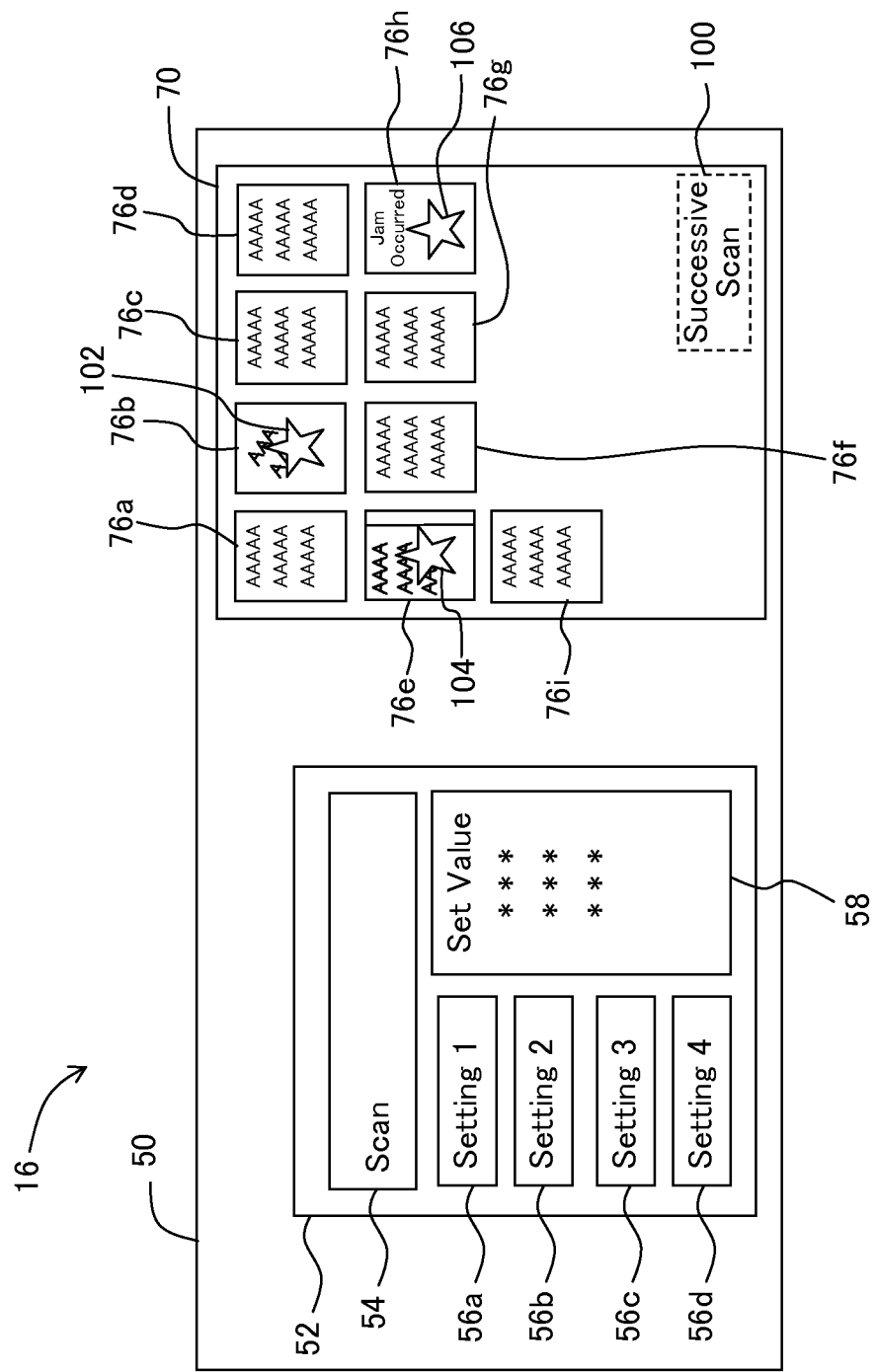
FIG. 10 shows a main window and a preview window according to a third embodiment of the present teaching.

In the above embodiments, the successive scanning process is carried out by using the successive scan icon 78 movable on the preview window 70. However, it is possible to carry out the successive scanning process with a scan icon not movable on the preview window 70. In particular, in the PC 10 according to a third embodiment, display a plurality of images 76a to 76i and a successive scan icon 100 are displayed in the preview window 70 as shown in FIG. 10. The successive scan icon 100 cannot be dragged but can be clicked. However, the successive scan icon 100 in FIG. 10 stays in such a state as not to accept a click operation, that is, in a disabled state.

Further, in the same manner as the PC 10 in the second embodiment, the PC 10 in the third embodiment also includes an error image extraction section. Then, on the PC 10 in the third embodiment, if the error image extraction section extracts an error image, then a predetermined sign is displayed to overlap with the error image. In particular, for example, if the three images 76b, 76e and 76h are error images among the plurality of images 76a to 76i in the preview window 70, then signs 102, 104 and 106 are displayed to overlap with the images 76b, 76e and 76h, respectively. By virtue of this, the user recognizes which are the error images among the plurality of images 76a to 76i. Further, the signs 102, 104 and 106 in FIG. 10 are displayed with their outer edges being colored but their inner parts being not colored.

Then, by a user's operation to select the images on which the signs 102, 104 and 106 are displayed, it is possible to enable the successive scan icon 100 and thus to carry out the successive scanning process. In particular, for example, if the user carries out the left click on the two error images 76b and 76e among the three error images 76b, 76e and 76h, then as shown in FIG. 11, the signs 102 and 104 on the two error images 76b and 76e change in color. In detail, the inner parts of the signs 102 and 104 are colored. On this occasion, the successive scan icon 100 is in a state in which a click operation is acceptable, that is, in an enabled state. Then, by carrying out the left click on the successive scan icon 100, the successive scanning process is carried out. In the successive scanning process, the two error images 76b and 76e are changed to images of a new document. In this manner, on the PC 10 in the third embodiment, it is possible to change any of the plurality of error images to images of a new document.

Further, the present teaching is not limited to the above embodiments, but is practicable in various forms with various changes and/or improvements based on the knowledge of those skilled in the art. For example, in the above embodiments, the PC 10 is adopted as an apparatus for carrying out the successive scanning process. However, it is also possible to adopt a mobile terminal such as a smartphone or the like. Further, in the above embodiments, the mouse 18 is adopted as an operation unit for carrying out the button operation on the main scan icon 54 and the like. However, it is possible to adopt a manual operation button, a touch panel, or the like. In such cases, it is possible to carry out the selecting operation by a tap or the like instead of a left click.

Further, while the scan data is saved either in JPEG format or in PDF format in the above embodiments, it may be in other data formats. For example, BMP, TIFF, and the like may be applied as other data formats. In such cases, if a plurality of scan data can be stored in one file, then the scan data may be stored in the same manner as in PDF, whereas if not, then they may be stored in the same manner as in JPEG.

Further, in the above embodiments, the explanation was made with an example for the CPU 12 to carry out the processes shown in FIGS. 8A to 8D, etc. However, without being limited to the CPU 12, either an ASIC or other logic integrated circuits may carry out those processes. Further, a CPU or the like may cooperate with an ASIC or other logic integrated circuits to carry out those processes.

What is claimed is:

1. A non-transitory computer-readable medium storing computer-executable programs that, when executed by a processor, cause an information processing apparatus comprising: a display unit; an operation unit configured to output a signal depending on a user operation; and a storage unit configured to store scan data, to perform:

displaying preview images based on the scan data stored in the storage unit and a first icon which is draggable by the operation unit, concurrently on the display unit;

acquiring a drag destination of the first icon to which the first icon is dragged, based on the signal outputted from the operation unit depending on a drag operation on the first icon;

judging whether the drag destination of the first icon is one of a position overlapping with one preview image included in the preview images displayed on the display unit and a position adjacent to the one preview image;

in a case that the information processing apparatus has judged that the drag destination of the first icon is the position overlapping with the one preview image, determining an alignment sequence of the preview images displayed on the display unit and a preview image based on to-be-acquired scan data so that the one preview image is replaced with the preview image based on the to-be-acquired scan data;

in a case that the information processing apparatus has judged that the drag destination of the first icon is the position adjacent to the one preview image, determining the alignment sequence of the preview images displayed on the display unit and the preview image based on the to-be-acquired scan data so that the preview image based on the to-be-acquired scan data is arranged adjacent to the one preview image; and in response to determining the alignment sequence, updating the display of images on the display unit to reflect the determined alignment sequence, including the image based on the to-be-acquired scan data.

2. The medium according to claim 1, wherein the information processing apparatus further comprises a communication unit configured to communicate with a scanner, the programs cause the information processing apparatus to display a second icon which causes the scanner to execute a scanning process, on the display unit, the programs cause the information processing apparatus to further perform:

judging whether a selecting operation on the second icon is performed, based on the signal outputted from the operation unit;

in a case that the information processing apparatus has judged that the selecting operation on the second icon is performed, transmitting a scan command to the scanner via the communication unit; and receiving scan data transmitted from the scanner in response to the scan command as the to-be-acquired scan data, via the communication unit, and the programs cause the information processing apparatus to update display of the display unit so that the images displayed on the display unit and the image based on the scan data received from the scanner are displayed in accordance with the alignment sequence.

3. The medium according to claim 2, wherein the programs cause the information processing apparatus to further perform storing the scan data received from the scanner in the storage unit, in the case that the information processing apparatus has judged that the drag destination of the first icon is the position overlapping with the one image, the programs cause the information processing apparatus to store the scan data received from the scanner in the storage unit so that the image based on the to-be-acquired scan data is displayed on the display unit instead of the one image, and in the case that the information processing apparatus has judged that the drag destination of the first icon is the position adjacent to the one image, the programs cause the information processing apparatus to store the scan data received from the scanner in the storage unit so that the image based on the to-be-acquired scan data is displayed on the display unit adjacent to the one image.

4. The medium according to claim 3, wherein the programs cause the information processing apparatus to store the scan data in association with serial number in the storage unit, in the case that the information processing apparatus has judged that the drag destination of the first icon is the position overlapping with the one image, the programs cause the information processing apparatus to store, in the storage unit, the scan data received from the scanner in association with serial number which is stored in association with the scan data of the one image, and in the case that the information processing apparatus has judged that the drag destination of the first icon is the position adjacent to the one image, the programs cause the information processing apparatus to store, in the storage unit, the scan data received from the scanner in association with next smaller number or next greater number than the serial number which is stored in association with the scan data of the one image.

5. The medium according to claim 3, wherein in the case that the information processing apparatus has judged that the drag destination of the first icon is the position overlapping with the one image, the programs cause the information processing apparatus to store, in the storage unit, the scan data received from the scanner so that the scan data of the one image is overwritten by the scan data received from the scanner.

6. The medium according to claim 5, wherein after letting the storage unit store the scan data received from the scanner, in a case that a plurality of scan data is stored in the storage unit after the scan data received from the scanner is stored in the storage unit, the programs cause the information processing apparatus to join the plurality of scan data and store the joined data in the storage unit.

7. The medium according to claim 2, wherein the first icon is displayed as the second icon on the display unit.

8. The medium according to claim 1, wherein the first icon is displayed, on the display unit, as an icon which causes the display unit to display an alteration window for changing a set value for the scanning process to be performed by the scanner.

9. The medium according to claim 2, wherein the programs cause the information processing apparatus to transmit, to the scanner, a set value for the scanning process together with the scan command, each time the scan command is transmitted to the scanner, the programs cause the information processing apparatus to further perform storing the set value in the storage unit while updating the set value, and in the case that the information processing apparatus has judged that the drag destination of the first icon is the position adjacent to the one image, the programs cause the information processing apparatus to transmit the set value stored in the storage unit to the scanner, together with the scan command.

10. The medium according to claim 2, wherein in the case that the information processing apparatus has judged that the drag destination of the first icon is the position overlapping with the one image, the programs cause the information processing apparatus to transmit, to the scanner, the set value in relation to the scan data of the one image, together with the scan command.

11. The medium according to claim 1, wherein the programs cause the information processing apparatus to display a third icon for selecting a size of a document to be scanned by the scanner, on the display unit, the programs cause the information processing apparatus to further perform judging whether a selecting operation on the third icon is performed, based on the signal outputted by the operation unit, and in a case that the information processing apparatus has judged that the drag destination of the first icon is the position adjacent to the one image and that the selecting operation on the third icon is performed, the programs cause the information processing apparatus to display a fourth icon in a size corresponding to the size of the document selected by the selecting operation on the third icon, adjacent to the one image on the display unit.

12. An information processing apparatus comprising:

a display unit;

an operation unit configured to output a signal depending on a user operation;

a storage unit configured to store scan data; and a controller, wherein the controller is configured to:

display preview images based on the scan data stored in the storage unit and a first icon which is draggable by the operation unit, concurrently on the display unit;

acquire a drag destination of the first icon to which the first icon is dragged, based on the signal outputted from the operation unit depending on a drag operation on the first icon;

judge whether the drag destination of the first icon is one of a position overlapping with one preview image included in the preview images displayed on the display unit and a position adjacent to the one preview image;

in a case that the controller has judged that the drag destination of the first icon is the position overlapping with the one preview image, determine an alignment sequence of the preview images displayed on the display unit and a preview image based on to-be-acquired scan data so that the one preview image is replaced with the preview image based on the to-be-acquired scan data;

in a case that the controller has judged that the drag destination of the first icon is the position adjacent to the one preview image, determine the alignment sequence of the preview images displayed on the display unit and the preview image based on the to-be-acquired scan data so that the preview image based on the to-be-acquired scan data is arranged adjacent to the one preview image; and in response to determining the alignment sequence, updating the display of images on the display unit to reflect the determined alignment sequence, including the image based on the to-be-acquired scan data.

13. An information processing method to be executed by an information processing apparatus provided with: a display unit; an operation unit configured to output a signal depending on a user operation; and a storage unit configured to store scan data, the method comprising:

displaying preview images based on the scan data stored in the storage unit and a first icon which is draggable by the operation unit, concurrently on the display unit;

acquiring a drag destination of the first icon to which the first icon is dragged, based on the signal outputted from the operation unit depending on a drag operation on the first icon;

judging whether the drag destination of the first icon is one of a position overlapping with one preview image included in the preview images displayed on the display unit and a position adjacent to the one preview image;

in a case that the information processing apparatus has judged that the drag destination of the first icon is the position overlapping with the one preview image, determining an alignment sequence of the preview images displayed on the display unit and a preview image based on to-be-acquired scan data so that the one preview image is replaced with the preview image based on the to-be-acquired scan data;

in a case that the information processing apparatus has judged that the drag destination of the first icon is the position adjacent to the one preview image, determining the alignment sequence of the preview images displayed on the display unit and the preview image based on the to-be-acquired scan data so that the preview image based on the to-be-acquired scan data is arranged adjacent to the one preview image; and in response to determining the alignment sequence, updating the display of images on the display unit to reflect the determined alignment sequence, including the image based on the to-be-acquired scan data.

14. The method according to claim 13, wherein the information processing apparatus further comprises a communication unit configured to communicate with a scanner, the information processing apparatus displays a second icon which causes the scanner to execute a scanning process, on the display unit, the method further comprising:

judging whether a selecting operation on the second icon is performed, based on the signal outputted from the operation unit;

in a case that the information processing apparatus has judged that the selecting operation on the second icon is performed, transmitting a scan command to the scanner via the communication unit; and receiving scan data transmitted from the scanner in response to the scan command as the to-be-acquired scan data, via the communication unit, and the information processing apparatus updates display of the display unit so that the images displayed on the display unit and the image based on the scan data received from the scanner are displayed in accordance with the alignment sequence.

15. The method according to claim 14, wherein the method further comprising storing the scan data received from the scanner in the storage unit, in the case that the information processing apparatus has judged that the drag destination of the first icon is the position overlapping with the one image, the information processing apparatus stores the scan data received from the scanner in the storage unit so that the image based on the to-be-acquired scan data is displayed on the display unit instead of the one image, and in the case that the information processing apparatus has judged that the drag destination of the first icon is the position adjacent to the one image, the information processing apparatus stores the scan data received from the scanner in the storage unit so that the image based on the to-be-acquired scan data is displayed on the display unit adjacent to the one image.

16. The method according to claim 15, wherein the information processing apparatus stores the scan data in association with serial number in the storage unit, in the case that the information processing apparatus has judged that the drag destination of the first icon is the position overlapping with the one image, the information processing apparatus stores, in the storage unit, the scan data received from the scanner in association with serial number which is stored in association with the scan data of the one image, and in the case that the information processing apparatus has judged that the drag destination of the first icon is the position adjacent to the one image, the information processing apparatus stores, in the storage unit, the scan data received from the scanner in association with next smaller number or next greater number than the serial number which is stored in association with the scan data of the one image.

* * * * *